(12) United States Patent
Umeda

(10) Patent No.: US 10,180,999 B2
(45) Date of Patent: Jan. 15, 2019

(54) MODEL GENERATING DEVICE AND METHOD

(71) Applicant: FUJITSU LIMITED, Kawasaki-shi, Kanagawa (JP)

(72) Inventor: Yuhei Umeda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 424 days.

(21) Appl. No.: 15/006,874

(22) Filed: Jan. 26, 2016

(65) Prior Publication Data

US 2016/0253442 A1 Sep. 1, 2016

(30) Foreign Application Priority Data

Feb. 27, 2015 (JP) .................................. 2015-039578

(51) Int. Cl.
| | |
|---|---|
| G06F 7/60 | (2006.01) |
| G06F 17/10 | (2006.01) |
| G06F 17/50 | (2006.01) |
| G05B 13/04 | (2006.01) |

(52) U.S. Cl.
CPC ......... G06F 17/5009 (2013.01); G05B 13/04 (2013.01)

(58) Field of Classification Search
CPC ................................................ G06F 17/5009
USPC ............................................................ 703/2
See application file for complete search history.

(56) References Cited

U.S. PATENT DOCUMENTS

| | | | | |
|---|---|---|---|---|
| 2003/0226544 A1* | 12/2003 | Nakamori | ........... | F02D 41/0072 123/406.48 |
| 2009/0198474 A1* | 8/2009 | Fritz | ..................... | G01M 15/06 702/183 |

OTHER PUBLICATIONS

Shimojo et al., "Soot Modeling for Gasoline Engine using Quasi-Stationary Measurement", the 1st Multisymposium by the Control Division of the Society of Instrument and Control Engineers (SICE), with English Abstract, 2014 (5 pages).

* cited by examiner

Primary Examiner — Timothy A Mudrick
(74) Attorney, Agent, or Firm — Fujitsu Patent Center

(57) ABSTRACT

A model generating device for generating model data regarding an operation state of a target object to be controlled, includes a memory and a processor coupled to the memory and configured to acquire first measurement data regarding the operation state of the target object under each of a plurality of measurement conditions set in a first sequence, acquire second measurement data regarding the operation state of the target object under each of the plurality of measurement conditions set in a second sequence different from the first sequence, estimate third measurement data indicating the operation state in a case where the target object enters a steady state in each of the plurality of measurement conditions, based on the first measurement data and the second measurement data, generate the model data regarding the operation state of the target object based on the third measurement data, and output the model data.

12 Claims, 6 Drawing Sheets

MODEL GENERATING DEVICE AND METHOD

CROSS-REFERENCE TO RELATED APPLICATION

This application is based upon and claims the benefit of priority of the prior Japanese Patent Application No. 2015-039578, filed on Feb. 27, 2015, the entire contents of which are incorporated herein by reference.

FIELD

The embodiments discussed herein are related to model generation.

BACKGROUND

In typical control design, how to control a controlled object is designed using a model of the controlled object. In this control design, measurement conditions set as parameters for controlling the controlled object are changed and then the state of the controlled object is measured after waiting until the controlled object enters the steady state. In the control design, the model of the controlled object is generated based on the measured measurement data. For example, related techniques are disclosed by Kanako SHIMOJO et al., "Soot Modeling for Gasoline Engine using Quasi-Stationary Measurement", the 1st Multisymposium by the Control Division of the Society of Instrument and Control Engineers (SICE), 2014.

SUMMARY

According to an aspect of the invention, a model generating device for generating model data regarding an operation state of a target object to be controlled, includes a memory and a processor coupled to the memory and configured to acquire first measurement data regarding the operation state of the target object under each of a plurality of measurement conditions set in a first sequence, acquire second measurement data regarding the operation state of the target object under each of the plurality of measurement conditions set in a second sequence different from the first sequence, estimate third measurement data indicating the operation state in a case where the target object enters a steady state in each of the plurality of measurement conditions, based on the first measurement data and the second measurement data, generate the model data regarding the operation state of the target object based on the third measurement data, and output the model data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

According to such typical techniques, measurement is performed after waiting until the state of the controlled object enters the steady state for each measurement condition and thus, it takes time to collect measurement data in the steady state. To generate an accurate model, it is desirable that there be abounding measurement data. When acquisition of the measurement data in the steady state is attempted under many measurement conditions, it takes much time to collect the measurement data.

According to one aspect, an objective of the present disclosure is to collect measurement data in the steady state in a short time.

Embodiments of an information processing device, a model generation program, and a model generation method that the present application discloses are described in detail below with reference to the drawings. These embodiments are not intended to limit the techniques disclosed herein. It is also allowed to combine the embodiments described below as desired as long as no contradiction is caused.

Embodiment 1

System Configuration

In control design, how to control a controlled object is designed using a model of the controlled object. A system 1 generates a model of a controlled object. The present embodiment describes a case in which the controlled object is an engine and the control design is performed for the engine as an example. In the control design of the engine, to determine values used in controlling the engine, one engine is actually operated and how the state of the engine is changed by the operation for the engine is measured, and modeling is performed on the engine in accordance with the measurement data that has been measured. For example, in the control design of the engine, a model is generated by measuring how exhaust gas or fuel consumption changes as the degree of valve opening or the fuel injection quantity changes. In the control design of the engine, how to control the engine is designed using the generated model. For example, in the control design of the engine, based on the generated model, the degree of valve opening or the fuel injection quantity suitable for suppression of the exhaust gas or the fuel consumption is designed while obtaining desired output.

Figure 1:
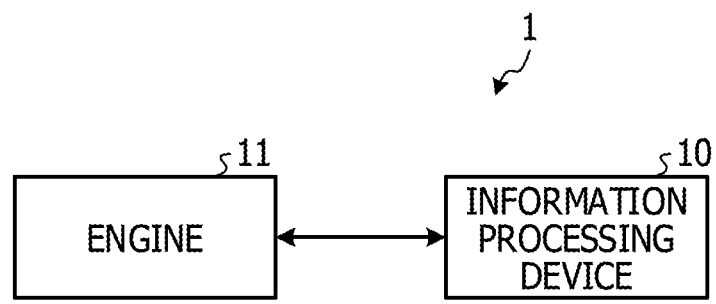
FIG. 1 is an explanatory diagram for describing an example of a system configuration.

FIG. 1 is an explanatory diagram for describing an example of the configuration of the system 1. As illustrated in FIG. 1, the system 1 includes an information processing device 10 and an engine 11.

The engine 11 is an object set as a controlled object of the control design.

The information processing device 10 is an apparatus that generates a model of the engine 11 set as the controlled object. The information processing device 10 is, for example, a computer, such as a personal computer or a server computer. The information processing device 10 may be implemented as a single computer or may be implemented by a plurality of computers. The present embodiment describes a case in which the information processing device 10 is a single computer as an example.

The information processing device 10 operates the engine 11 under various measurement conditions. For example, the information processing device 10 changes a measurement condition set as a parameter for controlling the engine 11 and an operation instruction is output to the engine 11. The parameter serves as input information for the model in the control design. Examples of the parameter for controlling the engine 11 include the degree of valve opening and the fuel injection quantity. The parameter is not limited to these examples.

The information processing device 10 acquires the measurement data that indicates the state of the engine 11 under each measurement condition. For example, the information processing device 10 acquires measurement data before the engine 11 converges on the steady state under each measurement condition. For example, the information processing device 10 acquires the measurement data that indicates the state of the engine 11 in a certain period before the engine 11 converges on the steady state after the parameter is changed to suit a certain measurement condition. Examples of the measurement data include the respective concentrations of a nitrogen oxide ($NO_x$), a particulate matter (PM), and a carbon dioxide ($CO_2$) included in the exhaust gas, and data on the fuel consumption.

[Configuration of Information Processing Device]

Figure 2:
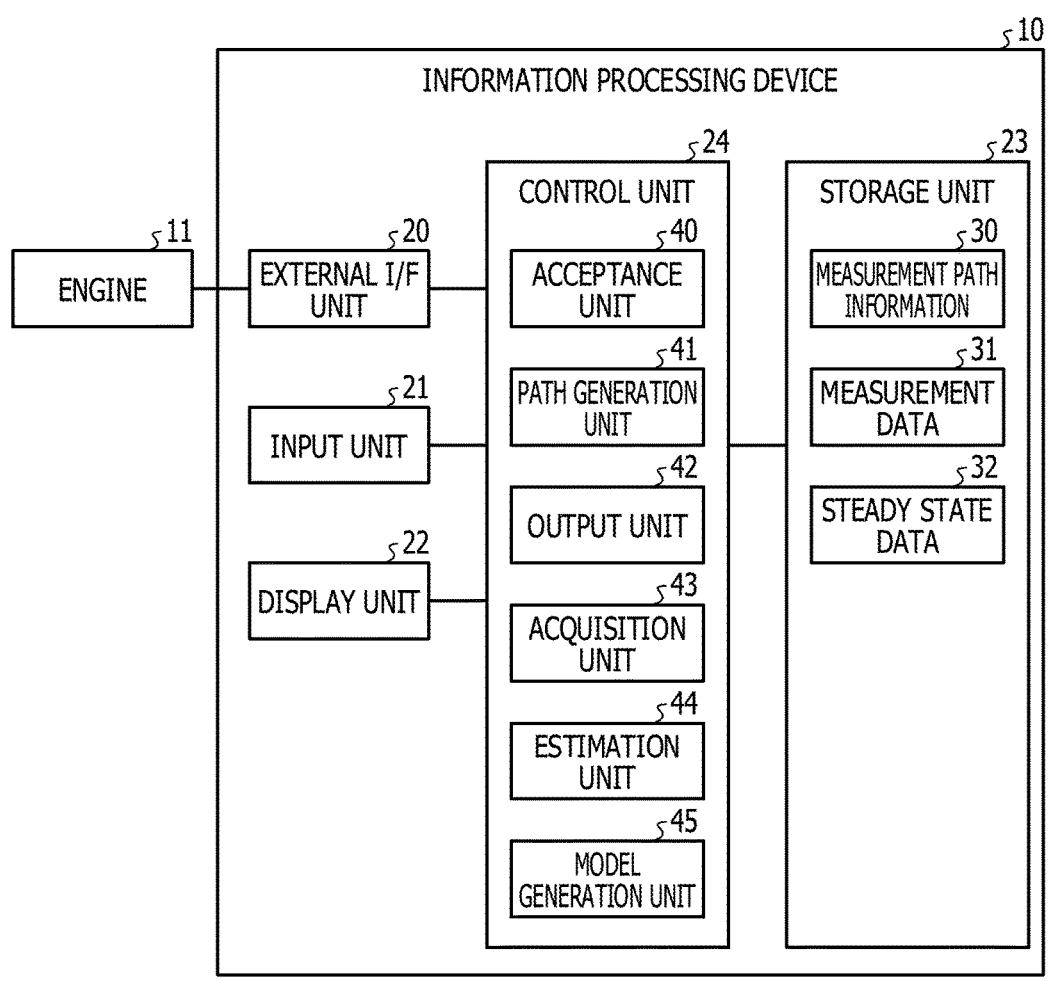
FIG. 2 illustrates an example of a functional configuration of an information processing device.

The information processing device 10 according to the present embodiment is described below. FIG. 2 illustrates an example of a functional configuration of the information processing device 10. As illustrated in FIG. 2, the information processing device 10 includes an external interface (I/F) unit 20, an input unit 21, a display unit 22, a storage unit 23, and a control unit 24. The information processing device 10 may include another device different from the above-described devices.

The external I/F unit 20 is an interface that performs input and output of information together with another device. Examples of the external I/F unit 20 that may be employed include various input and output ports, such as a universal serial bus (USB), and a network interface card, such as a local area network (LAN) card.

The external I/F unit 20 performs transmission or reception of various kinds of information together with another device through a communication cable, which is not illustrated. For example, the external I/F unit 20 outputs an operation instruction that designates a measurement condition to a controller that controls the engine 11 and is not illustrated. The controller operates the engine 11 under the designated measurement condition. The controller measures the state of the engine 11 at certain intervals. For example, the controller measures the respective concentrations of $NO_x$, PM, and $CO_2$ included in the exhaust gas of the engine 11 or the fuel consumption at intervals of 16 ms. At certain intervals, the controller further correlates data indicating the measured state of the engine 11 with measurement time, and outputs the resultant data as the measurement data. That is, the controller outputs the measurement data in time sequence at every measurement. The external I/F unit 20 receives the measurement data output from the controller.

The input unit 21 is an input device for inputting various kinds of information. Examples of the input unit 21 include an input device that accepts input of operation, such as a mouse or a keyboard. The input unit 21 accepts input of various kinds of information on the control design. For example, for each parameter for controlling the engine 11, the input unit 21 accepts input of the range settable for the parameter. The input unit 21 accepts input of operation from a user and inputs the operation information indicating the content of the accepted operation to the control unit 24.

The display unit 22 is a display device that displays various kinds of information. Examples of the display unit 22 include a display device, such as a liquid crystal display (LCD) or a cathode ray tube (CRT). For example, the display unit 22 displays various screens, such as an operation screen.

The storage unit 23 is a storage device that stores various kinds of data. For example, the storage unit 23 is a storage device, such as a hard disk, a solid state drive (SSD), or an optical disc. The storage unit 23 may be semiconductor memory where data is rewritable, such as random-access memory (RAM), flash memory, or nonvolatile static RAM (NVSRAM).

The storage unit 23 stores an operating system (OS) or various programs executed in the control unit 24. For example, the storage unit 23 stores various programs, which include a program for executing a model generation process described below. Further, the storage unit 23 stores various kinds of data used in the program that is executed in the control unit 24. For example, the storage unit 23 stores measurement path information 30, measurement data 31, and steady state data 32.

The measurement path information 30 is data where how to change a measurement condition set as a parameter for controlling the engine 11 is stored. For example, in the measurement path information 30, a plurality of measurement conditions regarding the parameters are stored in the order in which the measurement conditions are changed.

The measurement data 31 is data where the measurement data on the engine 11 is stored. In the measurement data 31, for each measurement condition, the measurement data is correlated with the measurement condition and stored.

The steady state data 32 is data where, for each measurement condition, the measurement data in an estimated steady state of the engine 11 is stored.

The control unit 24 is a device that controls the information processing device 10. Examples of the control unit 24 that may be employed include an electronic circuit, such as a central processing unit (CPU) or a micro processing unit (MPU), and an integrated circuit, such as an application specific integrated circuit (ASIC) or a field programmable gate array (FPGA). The control unit 24 includes internal memory for storing a program where various processing operations are specified or control data and executes various processes in accordance with the program or the control data. The control unit 24 functions as various processing units when various programs are operated. For example, the control unit 24 includes an acceptance unit 40, a path generation unit 41, an output unit 42, an acquisition unit 43, an estimation unit 44, and a model generation unit 45.

The acceptance unit 40 performs various kinds of acceptance. For example, the acceptance unit 40 accepts various operation instructions regarding the control design. For example, the acceptance unit 40 causes the display unit 22 to display an operation screen regarding the control design and accepts the input of the operation instruction that instructs the start of model generation through the operation screen. For each parameter for controlling the engine 11 through the operation screen, the acceptance unit 40 accepts input of the range settable for the parameter.

The path generation unit 41 generates a plurality of measurement conditions regarding the parameters for controlling the controlled object by correlating the plurality of measurement conditions with a certain sequence. For example, the path generation unit 41 generates a plurality of measurement conditions regarding the parameters for controlling the engine 11. For example, the path generation unit 41 uses design of experiments (DoE) to generate a plurality of measurement conditions, which specify combinations of values set for the parameters for controlling the engine 11 within the range accepted in the acceptance unit 40. The DoE may employ any scheme using, for example, space filling, uniform random numbers, or latin hypercube. In the DoE, combinations of values for efficient measurement within the range for each parameter are generated as the measurement conditions. The path generation unit 41 may generate the plurality of measurement conditions by a method other than the DoE. For example, the path generation unit 41 may generate combinations of values at random or at certain intervals within the range for each parameter as the measurement conditions.

The path generation unit 41 generates a path that connects the plurality of measurement conditions that have been generated in a certain sequence. For example, the path generation unit 41 sequentially connects the plurality of measurement conditions with a single stroke and generates a measurement path by adding a measurement condition away from the final measurement condition connected with the single stroke.

The path generation unit 41 causes the generated measurement path to be stored in the measurement path information 30. For example, the path generation unit 41 correlates the plurality of measurement conditions with the order in which the measurement conditions are changed and causes the measurement conditions to be stored in the measurement path information 30.

The output unit 42 causes an operation instruction that designates the measurement condition to be output from the external I/F unit 20 to the controller that controls the engine 11 and is not illustrated. For example, the output unit 42 outputs operation instructions for operating the engine 11 under the measurement conditions in the sequence of the order stored in the measurement path information 30 and in the reverse sequence thereof. That is, the output unit 42 outputs operation instructions for operating the engine 11 under the measurement conditions along the outward course and the return course of the measurement path. The parameters are changed to suit the measurement conditions and the engine 11 operates under the measurement conditions. In the external I/F unit 20, the measurement data indicating the state of the engine 11 for which the parameters are changed to suit the measurement conditions is received in time sequence. The output unit 42 outputs the operation instructions along the outward course and the return course of the measurement path. Thus, the measurement data is measured based on the measurement conditions in each of the outward course and the return course of the measurement path.

The acquisition unit 43 acquires the measurement data indicating the state of the engine 11, which is received in the external I/F unit 20. For example, for each measurement condition, the acquisition unit 43 acquires the measurement data before the engine 11 converges on the steady state. For example, the acquisition unit 43 acquires the measurement data in a certain period after a measurement condition is changed. After a measurement condition is changed, it takes time for the output of the engine 11 to enter the steady state. For example, it takes approximately several minutes to several tens of minutes for the output of the engine 11 to enter the steady state after a measurement condition is changed. For each measurement condition, the acquisition unit 43 acquires the measurement data in a certain period that is shorter than the time taken for the engine 11 to converge on the steady state. As for the engine 11, the length of the certain period is, for example, approximately several seconds to several tens of seconds. It is desired that the certain period be less than the time taken for the engine 11 to converge on the steady state.

The acquisition unit 43 correlates the acquired measurement data with the measurement conditions for which the operation instructions are made and sequentially causes the measurement data to be stored in the measurement data 31. Although the present embodiment describes a case in which the measurement data are correlated with the measurement conditions in the acquisition unit 43, for example, the controller that controls the engine 11 may cause the measurement conditions to be included in the measurement data and transmit the measurement data.

For each measurement condition, the estimation unit 44 estimates the measurement data in the steady state in accordance with the measurement data respectively acquired in a certain sequence and the reverse sequence thereof. For example, the estimation unit 44 reads the measurement data corresponding to the measurement conditions stored in the measurement data 31. As described above, it takes time for the output of the engine 11 to enter the steady state after a measurement condition is changed. For example, it takes approximately several minutes to several tens of minutes for the output of the engine 11 to enter the steady state after a measurement condition is changed. Thus, the measurement data before the entrance into the steady state after a change in measurement condition differs, depending on whether the course of the measurement path is the outward course or the return course. However, the respective measurement data acquired in the outward course and the return course of the measurement path exponentially converge on the measurement data in the steady state identical over time. Therefore, for each measurement condition, the estimation unit 44 estimates the measurement data in the steady state using a prediction equation with which the respective measurement data respectively acquired in the outward course and the return course of the measurement path exponentially converge on the measurement data in the steady state identical over time. The estimation unit 44 uses the prediction equation to estimate the measurement data in the steady state for each type of the measurement conditions and the measurement data. For example, the estimation unit 44 estimates the measurement data in the steady state under each measurement condition for each of the concentrations of $NO_x$, PM, and $CO_2$ and the fuel consumption.

For example, the estimation unit 44 estimates the measurement data in the steady state using prediction equations (1) and (2) below. The prediction equations (1) and (2) are equations for estimating the measurement data in the steady state with respect to type y, which may be also referred to as parameter y hereinafter.

$$y_1(t_1) = y(\infty) + \{y(\infty) + y_1(0)\} \times \exp(-b_1 \times t_1) \quad (1)$$

$$y_2(t_2) = y(\infty) + \{y(\infty) + y_2(0)\} \times \exp(-b_2 \times t_2) \quad (2)$$

In the equations (1) and (2), $y(\infty)$ indicates the measurement data in the steady state where the parameter y converges while $b_1$ and $b_2$ each represent a value that indicates the degree of exponential convergence, and $y(\infty)$, $b_1$, and $b_2$ are variables. For example, $y_1(0)$ indicates the value of the measurement data of the type y, which is first obtained after the measurement condition is set in the outward course of the measurement path. For example, $y_2(0)$ indicates the value of the measurement data of the type y, which is first obtained after the measurement condition is set in the return course of the measurement path. For example, $t_1$ indicates the elapsed time after the measurement time of the measurement data of $y_1(0)$. For example, $t_2$ indicates the elapsed time after the measurement time of the measurement data of $y_2(0)$.

According to the equations (1) and (2), the elapsed time $t_1$ and $t_2$ become ∞ and converge on $y(\infty)$. From the equation (1), the value of the type y is predicted to be $y_1(t_1)$ after the elapsed time $t_1$. From the equation (2), the value of the type y is predicted to be $y_2(t_2)$ after the elapsed time $t_2$.

For each measurement condition, the estimation unit 44 determines $y(\infty)$, $b_1$, and $b_2$ that allow the measurement data predicted from the equations (1) and (2) to approximate the measurement data actually measured. For example, the estimation unit 44 solves an optimization problem for minimizing an error between the predicted measurement data and the measurement data actually measured and determines $y(\infty)$, $b_1$, and $b_2$.

For example, when the error is assumed to be the sum of squares (L2 norm), the error may be expressed as an equation (3) below.

$$\frac{1}{N_1}\sum_{t_1=0}^{N_1-1}(y_1(t_1)-\tilde{y}_1(t_1))^2 + \frac{1}{N_2}\sum_{t_2=0}^{N_2-1}(y_2(t_2)-\tilde{y}_2(t_2))^2 \quad (3)$$

In the equation (3), $y_1(t_1)$ indicates the prediction value of the measurement data corresponding to the elapsed time $t_1$, which is predicted from the equation (1), $y1(t_1)$ indicates the actual measurement value of the measurement data actually measured in the elapsed time $t_1$, $y_2(t_2)$ indicates the prediction value of the measurement data corresponding to the elapsed time $t_2$, which is predicted from the equation (2), and $y2(t_2)$ indicates the actual measurement value of the measurement data actually measured in the elapsed time $t_2$. For example, $N_1$ indicates the number of pieces of data of the measurement data actually measured under the measurement conditions for the outward course of the measurement path. For example, $N_2$ indicates the number of pieces of data of the measurement data actually measured under the measurement conditions for the return course of the measurement path.

The estimation unit 44 reads the actual measurement data from the measurement data 31 for each measurement condition. After that, for each measurement path, the estimation unit 44 uses the measurement time included in the read measurement data to determine the elapsed time of each measurement data after the measurement data is first measured. For example, the estimation unit 44 determines the elapsed time $t_1$ regarding the measurement data of the outward course of the measurement path and determines the elapsed time $t_2$ regarding the measurement data of the return course of the measurement path.

After that, as expressed in the equation (3), the estimation unit 44 calculates $y(\infty)$, $b_1$, and $b_2$ by solving an optimization problem for minimizing an error between the prediction values $y_1(t_1)$ and $y_2(t_2)$ of the measurement data corresponding to the elapsed time $t_1$ and $t_2$, in which the measurement data are actually measured, and the actual measurement values $y1(t_1)$ and $y2(t_2)$ of the measurement data. For example, the estimation unit 44 changes $y(\infty)$, $b_1$, and $b_2$ by a steepest descent method, a genetic algorithm (GA), or the like and calculates $y(\infty)$, $b_1$, and $b_2$ that enable minimization in the equation (3). That is, the estimation unit 44 performs fitting on the equations (1) and (2) so that the error between the predicted measurement data and the measurement data actually measured is made small. Accordingly, $y(\infty)$, which the measurement data in the steady state, is estimated.

For each measurement condition, the estimation unit 44 estimates the measurement data in the steady state for the type of each measurement data. For example, for each measurement condition, the estimation unit 44 estimates the measurement data in the steady state regarding the concentrations of $NO_x$, PM, and $CO_2$ or the fuel consumption. The estimation unit 44 correlates the measurement data in the steady state predicted for each type with the measurement conditions and causes the measurement data to be stored in the steady state data 32.

The model generation unit 45 generates the model of the engine 11. For example, the model generation unit 45 performs machine learning for each type of the measurement data using the measurement conditions stored in the steady state data 32 and the measurement data in the steady state corresponding to the measurement conditions to generate the model. For example, for each of the concentrations of $NO_x$, PM, and $CO_2$ and the fuel consumption, the model generation unit 45 generates the model by a method of outputting the weighted mean of peripheral data through, for example, regression analysis that uses a local linear model tree (LOLIMOT) or a Gaussian process. Accordingly, the generated model enables the concentrations of $NO_x$, PM, and $CO_2$ and the fuel consumption under various measurement conditions to be predicted.

Figure 3:
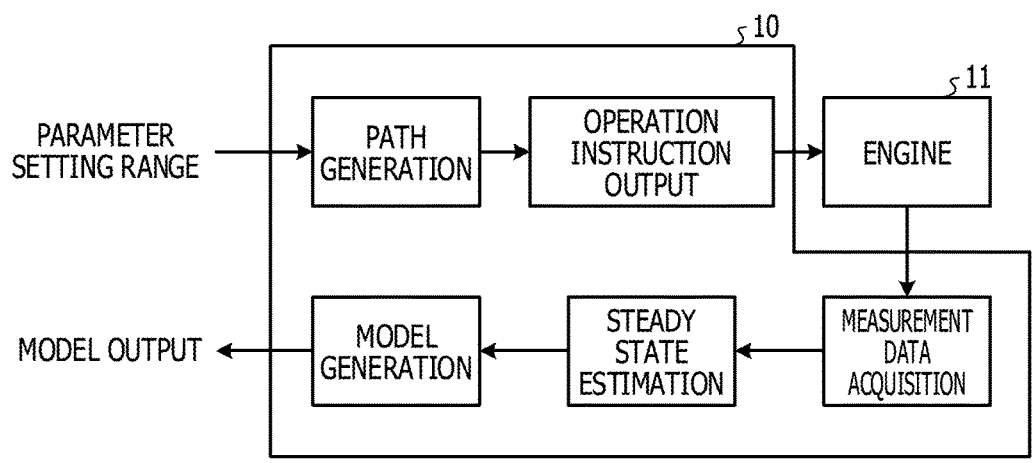
FIG. 3 schematically illustrates a procedure of generating a model.

Described below are specific examples for explanation. FIG. 3 schematically illustrates the procedure of generating the model. In the information processing device 10, for each parameter for controlling the engine 11, the acceptance unit 40 accepts input within the range settable for the parameter.

Figure 4:
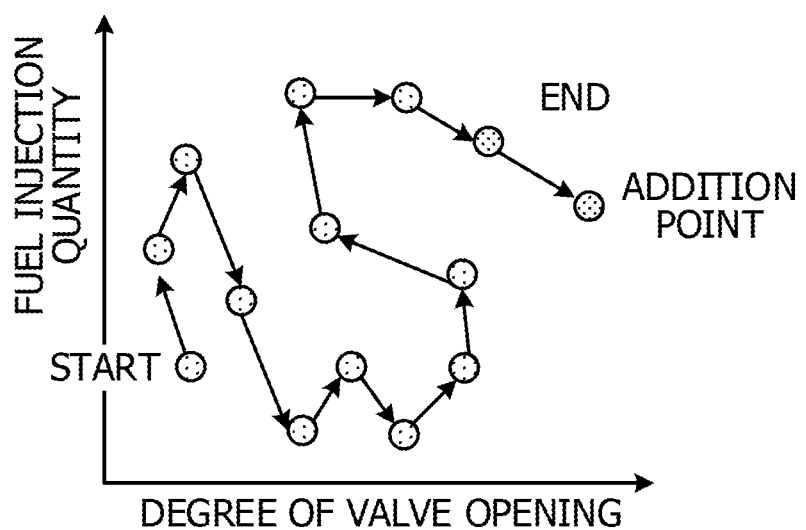
FIG. 4 schematically illustrates an example of generation of a measurement path.

The path generation unit 41 uses the DE to generate the plurality of measurement conditions that respectively specify the combinations of the values set as the parameters for controlling the engine 11 within the range accepted in the acceptance unit 40. For example, the path generation unit 41 generates the plurality of measurement conditions that specify the degree of valve opening and the fuel injection quantity using the DoE. FIG. 4 schematically illustrates an example of the generation of the measurement path. In the example of FIG. 4, each point indicates the measurement condition.

The path generation unit 41 connects the plurality of measurement conditions with a single stroke and adds a measurement condition away from the final measurement condition connected with the single stroke. In the example of FIG. 4, the measurement conditions are sequentially connected from the start point to the end point and after the end point, an addition point is added, where a difference in measurement condition between the end point and the preceding point of the end point is doubled. The path generation unit 41 generates the measurement path by sequentially connecting the plurality of measurement conditions with the single stroke from the start point to the addition point. The path generation unit 41 correlates the plurality of measurement conditions with the order in the generated measurement path and causes the plurality of measurement conditions to be stored in the measurement path information 30.

The output unit 42 sequentially outputs the respective operation instructions on the measurement conditions from the start point to the addition point along the outward course of the measurement path. After outputting the operation instruction on the measurement condition at the addition point, the output unit 42 sequentially outputs the respective operation instructions on the measurement conditions from the end point to the start point along the return course of the measurement path. The intervals at which the operation instructions are output may be intervals that enable the acquisition unit 43 to acquire the measurement data at certain time before the engine 11 converges on the steady state. For example, the output unit 42 outputs the respective operation instructions on the measurement conditions at certain time intervals.

For each measurement condition, the acquisition unit 43 acquires the measurement data at certain time before the engine 11 converges on the steady state. The acquisition unit 43 correlates the acquired measurement data with the measurement conditions for which the operation instructions are made and sequentially causes the measurement data to be stored in the measurement data 31.

The estimation unit 44 uses the equations (1) to (3) to, for each measurement condition, estimate the measurement data in the steady state regarding the type of each measurement data from the actual measurement data stored in the measurement data 31. The estimation unit 44 correlates the predicted measurement data in the steady state of each type with the measurement conditions and causes the measurement data to be stored in the steady state data 32.

The model generation unit 45 performs machine learning for each type of the measurement data using the measurement conditions stored in the steady state data 32 and the measurement data in the steady state corresponding to the measurement conditions to generate the model. Accordingly, the generated model enables the measurement data under various measurement conditions to be predicted for each type of the measurement data.

In typical control design, measurement conditions set as parameters for controlling a controlled object are changed and then the state of the controlled object is measured after waiting until the state of the controlled object enters the steady state. For example, when the controlled object is the engine 11, in the typical control design, the state of the engine 11 is measured after waiting for approximately several minutes to several tens of minutes before the state of the engine 11 enters the steady state. Determination on whether the engine 11 is in the steady state is performed by, for example, a measurer visually checking whether the measurement data is stabilized. Thus, in the typical control design, it takes much time to obtain measurement data under one measurement condition. To generate an accurate model of the controlled object, it is preferable that the number of pieces of measurement data be large. However, when it is attempted to obtain the measurement data in the steady state using many measurement conditions, it takes much time to collect the measurement data. For example, as for the engine 11, the parameters that are set increase due to sophistication. As the number of set parameters increases with such enhancement of the engine performance, the measurement data collected using more measurement conditions are desired so as to generate an accurate model. In the typical control design, however, it is unlikely to obtain the measurement data sufficient in number of pieces and the generation of an accurate model is difficult accordingly.

In contrast, in the information processing device 10 according to the present embodiment, it is undesired to wait until the engine 11 enters the steady state, the time taken for the acquisition of the measurement data under each measurement condition may be reduced. In addition, since the information processing device 10 according to the present embodiment allows proceeding to a subsequent measurement condition after certain time without determining whether the engine 11 is in the steady state for each measurement condition, the measurement of the state of the engine 11 under each measurement condition may be automated. Thus, the information processing device 10 according to the present embodiment may automatically acquire the measurement data under many measurement conditions in a short time and an accurate model may be generated accordingly.

[Procedure of Process]

Figure 5:
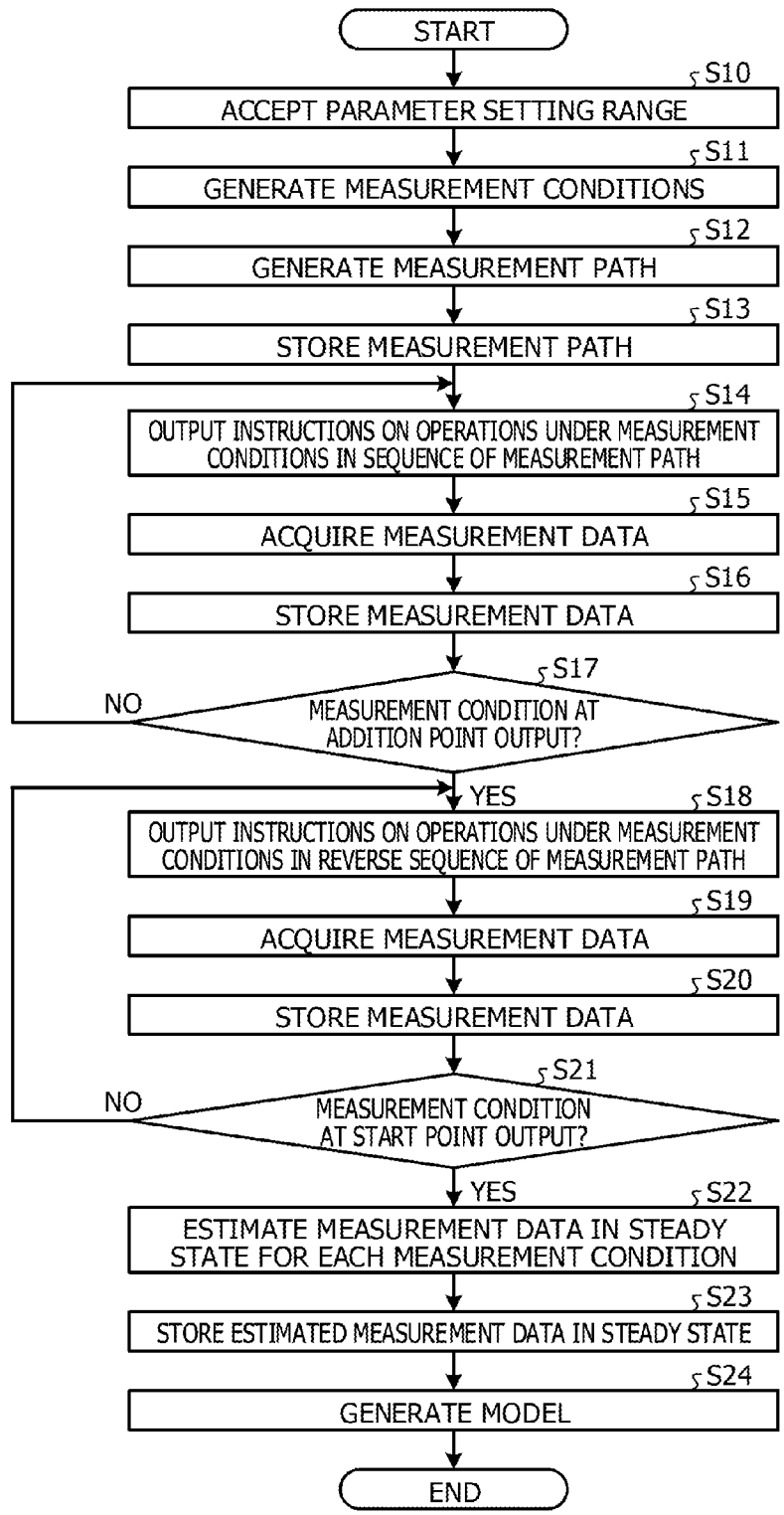
FIG. 5 is a flow chart that illustrates operations of a model generation process as an example.

The procedure of the model generation process in which the information processing device 10 according to the present embodiment generates a model is now described. FIG. 5 is a flow chart that illustrates operations of the model generation process as an example. The model generation process is executed at a certain timing, such as a timing at which input of the operation instruction for instructing the start of the model generation through an operation screen is accepted.

As illustrated in FIG. 5, for each parameter for controlling the engine 11, the acceptance unit 40 accepts input of the range settable for the parameter through an operation screen (S10).

The path generation unit 41 generates a plurality of measurement conditions using the DE, which specify combinations of values set as each parameter for controlling the engine 11 within each range accepted in the acceptance unit 40 (S11). For example, the path generation unit 41 generates a plurality of measurement conditions using the DE, which specify the degree of valve opening and the fuel injection quantity.

The path generation unit 41 sequentially connects the plurality of measurement conditions with a single stroke and generates a measurement path by adding a measurement condition away from the final measurement condition connected with the single stroke (S12). The path generation unit 41 correlates the plurality of measurement conditions with the order in which the measurement conditions are changed and causes the measurement path constituted of the plurality of measurement conditions to be stored in the measurement path information 30 (S13).

The output unit 42 outputs operation instructions for operating the engine 11 under the measurement conditions in the sequence of the order stored in the measurement path information 30 (S14). The acquisition unit 43 acquires the measurement data in a certain period after a measurement condition is changed (S15). The acquisition unit 43 correlates the acquired measurement data with the measurement condition and sequentially causes the measurement data to be stored in the measurement data 31 (S16).

The output unit 42 determines whether the measurement condition at the addition point is output (S17). When the measurement condition at the addition point is not output (NO in S17), the process returns to S14 described above, and the output unit 42 outputs the instructions on the operations under the measurement conditions in the sequence of the order stored in the measurement path information 30.

When the measurement condition at the addition point is output (YES in S17), the output unit 42 outputs the operation instructions for operating the engine 11 under the measurement conditions in the reverse sequence of the sequence of the order stored in the measurement path information 30 (S18). The acquisition unit 43 acquires the measurement data in a certain period after a measurement condition is changed (S19). The acquisition unit 43 correlates the acquired measurement data with the measurement condition and sequentially causes the measurement data to be stored in the measurement data 31 (S20).

The output unit 42 determines whether the measurement condition at the start point is output (S21). When the measurement condition at the start point is not output (NO in S21), the process returns to S18, and the output unit 42 outputs the instructions on the operations under the measurement conditions in the reverse sequence of the sequence of the order stored in the measurement path information 30.

When the measurement condition at the start point is output (YES in S21), for each measurement condition, the estimation unit 44 estimates the measurement data in the steady state from the actual measurement data stored in the measurement data 31 regarding the type of each measurement data (S22). The estimation unit 44 correlates the measurement data in the steady state predicted for each type with the measurement conditions and causes the measurement data to be stored in the steady state data 32 (S23).

The model generation unit 45 performs machine learning for each type of the measurement data using the measurement conditions stored in the steady state data 32 and the measurement data in the steady state corresponding to the measurement conditions and generates a model (S24), and the process ends.

Advantages

As described above, the information processing device 10 according to the present embodiment generates a plurality of measurement conditions regarding the parameters for controlling a controlled object by correlating the plurality of measurement conditions with a certain sequence. The information processing device 10 outputs respective instructions on operations under the generated measurement conditions in a certain sequence and in the reverse sequence of the certain sequence. The information processing device 10 acquires the measurement data indicating the state of the controlled object for which the parameters are changed to suit the measurement conditions in accordance with the output operation instructions. For each measurement condition, the information processing device 10 estimates the measurement data in the steady state from the measurement data respectively acquired in the certain sequence and in the reverse sequence thereof. Accordingly, the information processing device 10 may collect the measurement data in the steady state in a short time. In this manner, since the information processing device 10 may collect the measurement data in the steady state in a short time, the number of pieces of the measurement data may be increased and the accuracy of the model may be enhanced. Further, the information processing device 10 desires no checking as to whether the state of the controlled object is stabilized and thus, the measurement may be automated.

The information processing device 10 according to the present embodiment estimates the measurement data in the steady state, for each measurement condition, using a prediction equation with which the measurement data respectively acquired in the outward course and the return course of the measurement path exponentially converge on the measurement data in the steady state identical over time. Accordingly, the information processing device 10 may estimate the measurement data in the steady state with high accuracy.

In the information processing device 10 according to the present embodiment, the measurement data in the steady state is estimated by solving an optimization problem for minimizing an error between the measurement data predicted using the prediction equation and the acquired measurement data. Accordingly, the information processing device 10 may estimate the measurement data in the steady state with high accuracy.

The information processing device 10 according to the present embodiment acquires the measurement data before the convergence on the steady state. Accordingly, for each measurement condition, the information processing device 10 may collect the measurement data in a short time.

The information processing device 10 according to the present embodiment adds a measurement condition away from the final measurement condition in the certain sequence, and the added measurement condition is set as a turning point of the certain sequence and the reverse sequence. Accordingly, for each measurement condition, the information processing device 10 may acquire the measurement data that converges from a different measurement condition in the outward course and the return course of the identical measurement path.

Embodiment 2

Although the embodiment regarding the apparatus of the present disclosure is described above, the techniques disclosed in the present application may be implemented in various other forms in addition to the above-described embodiment. Thus, another embodiment included in the present application is described below.

For example, in the above-described embodiment, a case in which the controlled object is the engine 11 is taken as an example. However, the controlled object is not limited to the engine 11. For example, the controlled object may be any other object as long as it takes time for the state of the controlled object to be stabilized in the steady state after a measurement condition is changed. For example, the controlled object may be an actuator, a plant that performs various kinds of production, a large machine, or the like.

In the above-described embodiment, a case in which the error is the sum of squares (L2 norm) as expressed in the equation (3) indicated above is taken as an example. However, the error is not limited to L2 norm. For example, the error may be L1 norm as expressed in an equation (4) below.

$$\frac{1}{N_1}\sum_{t_1=0}^{N_1-1}|y_1(t_1)-\tilde{y}_1(t_1)|+\frac{1}{N_2}\sum_{t_2=0}^{N_2-1}|y_2(t_2)-\tilde{y}_2(t_2)| \quad (4)$$

In the above-described embodiment, a case in which a model is generated for each type of the measurement data is taken as an example. However, the model generation is not limited to this case. For example, a model for predicting a plurality of types of the measurement data may be generated by performing machine learning using the measurement conditions stored in the steady state data 32 and the measurement data in the steady state corresponding to the measurement conditions. For example, the model generation unit 45 may generate a single model for predicting all types of the measurement data.

In the above-described embodiment, a case in which the measurement path is constituted of the outward course and the return course of a single path that connects a plurality of measurement conditions in a certain sequence is taken as an example. However, the measurement path is not limited to this case. For example, the path generation unit 41 employs another course except the outward course and the return course of the single path as the measurement path. The measurement path may be set in another manner as long as a measurement condition preceding each measurement condition differs in each measurement path. That is, any manner may be used as long as the measurement path is set so that a measurement condition before arrival at each measurement condition differs.

The constituents of each of the illustrated devices are functionally conceptual and are not necessarily desired to be physically configured as illustrated. That is, the specific state of the distribution or the integration of each device is not limited to what is illustrated, and all or part of the devices may be configured through functional or physical distribution or integration in desired units, depending on various loads or usage patterns. For example, the respective processors of the acceptance unit 40, the path generation unit 41, the output unit 42, the acquisition unit 43, the estimation unit 44, and the model generation unit 45 may be integrated as desired. Further, all or desired part of the processing functions performed in the processors may be implemented by a CPU or a program that is analyzed and executed by the CPU, or may be implemented as hardware using wired logic.

[Model Generation Program]

Figure 6:
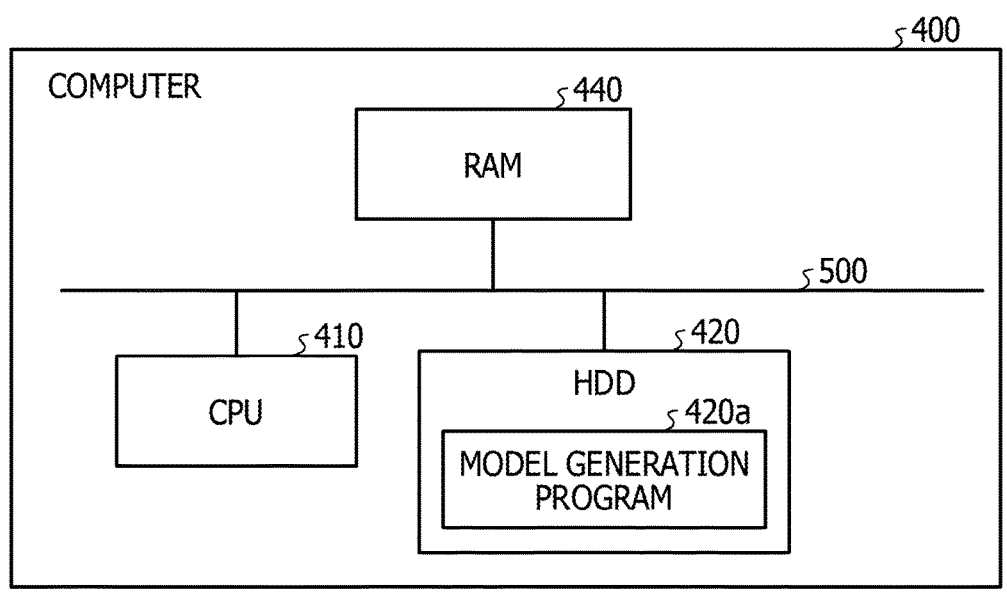
FIG. 6 is an explanatory diagram that illustrates an example of a configuration of a computer that executes a model generation program.

Each process described above in the embodiments may be implemented by executing a program prepared in advance with a computer system, such as a personal computer or a workstation. Thus, an example of the computer system that executes a program having functions similar to those in the above-described embodiments is described below. A model generation program of attention attracting control for a driver is described first. FIG. 6 is an explanatory diagram that illustrates an example of the configuration of a computer 400, which executes a model generation program 420a.

As illustrated in FIG. 6, the computer 400 includes a CPU 410, a hard disk drive (HDD) 420, and random access memory (RAM) 440. In the computer 400, the CPU 410, the HDD 420, and the RAM 440 are coupled to one another through a bus 500.

In the HDD 420, the model generation program 420a is stored in advance, which exerts functions similar to those of the acceptance unit 40, the path generation unit 41, the output unit 42, the acquisition unit 43, the estimation unit 44, and the model generation unit 45. The model generation program 420a may be separated when suitable.

The HDD 420 stores various kinds of information. For example, the HDD 420 stores various kinds of data used for determination of an OS or an order amount.

When the CPU 410 reads the model generation program 420a from the HDD 420a and executes the read generation program 420a, operations similar to those of each processor in the embodiments are executed. That is, the model generation program 420a executes operations similar to those of the acceptance unit 40, the path generation unit 41, the output unit 42, the acquisition unit 43, the estimation unit 44, and the model generation unit 45.

The model generation program 420a is not necessarily desired to be stored in the HDD 420 at the beginning.

For example, the model generation program 420a may be stored in a "portable physical medium", such as a flexible disk (FD) inserted in the computer 400, compact disc read-only memory (CD-ROM), a digital versatile disc (DVD), a magneto-optical disk, or an IC card. The computer 400 may read the program from such portable physical media and execute the read program.

The program may be stored in, for example, "another computer (or server)" coupled to the computer 400 through a public network, the Internet, a LAN, a wide area network (WAN), or the like. The computer 400 may read the program from the "computer (or server)" and execute the read program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A model generating device for generating model data regarding an operation state of a target object to be controlled, the model generating device comprising:
   a memory; and
   a processor coupled to the memory and configured to:
     acquire first measurement data regarding the operation state of the target object under each of a plurality of measurement conditions set in a first sequence,
     acquire second measurement data regarding the operation state of the target object under each of the plurality of measurement conditions set in a second sequence different from the first sequence,
     estimate third measurement data indicating the operation state in a case where the target object enters a steady state in each of the plurality of measurement conditions, based on the first measurement data and the second measurement data,
     generate the model data regarding the operation state of the target object based on the third measurement data, and
     output the model data,
   wherein the first measurement data and the second measurement data relate to the operation state before the target object enters the steady state when operated under each of the plurality of measurement conditions, and
   wherein the processor is configured to estimate the third measurement data by using a prediction equation with which the first measurement data acquired in the first sequence and the second measurement data acquired in the second sequence exponentially converge on the steady state identical over time for each of the plurality of measurement conditions.

2. The model generating device according to claim 1, wherein the second sequence is a reverse sequence of the first sequence.

3. The model generating device according to claim 2, wherein
   the processor is configured to set a first measurement condition lastly in the first sequence,
   the first measurement condition is added by doubling a difference between a second measurement condition set to precede the first measurement condition and a third measurement condition set to precede the second measurement condition,
   the first measurement condition, the second measurement condition and the third measurement condition are included in the plurality of measurement conditions.

4. The model generating device according to claim 1, wherein the processor is configured to estimate the third measurement data by solving an optimization problem for minimizing an error between fourth measurement data predicted from the prediction equation, and the first measurement data and the second measurement data.

5. A model generating method for generating model data regarding an operation state of a target object to be controlled, the model generating method comprising:
   operating the target object while changing a plurality of measurement conditions set for the target object in a first sequence;
   acquiring first measurement data regarding the operation state of the target object under each of the plurality of measurement conditions set in the first sequence;
   operating the target object while changing the plurality of measurement conditions in a second sequence different from the first sequence,
   acquiring second measurement data regarding the operation state of the target object under each of the plurality of measurement conditions set in the second sequence;
   estimating, by a processor, third measurement data indicating the operation state in a case where the target object enters a steady state in each of the plurality of measurement conditions, based on the first measurement data and the second measurement data;
   generating the model data regarding the operation state of the target object based on the third measurement data; and
   outputting the model data,
   wherein the first measurement data and the second measurement data relate to the operation state before the target object entering the steady state when operated under each of the plurality of measurement conditions, and
   wherein the third measurement data is estimated using a prediction equation with which the first measurement data acquired in the first sequence and the second measurement data acquired in the second sequence exponentially converge on the steady state identical over time for each of the plurality of measurement conditions.

6. The model generating method according to claim 5, wherein the second sequence is a reverse sequence of the first sequence.

7. The model generating method according to claim 6, further comprising:
   setting a first measurement condition lastly in the first sequence, and
   wherein the first measurement condition is added by doubling a difference between a second measurement condition set to precede the first measurement condition and a third measurement condition set to precede the second measurement condition, and
   the first measurement condition, the second measurement condition and the third measurement condition are included in the plurality of measurement conditions.

8. The model generating method according to claim 5, wherein the third measurement data is estimated by solving an optimization problem for minimizing an error between fourth measurement data predicted from the prediction equation, and the first measurement data and the second measurement data.

9. A non-transitory computer-readable storage medium storing a model generating program for generating model data regarding an operation state of a target object to be controlled, the model generating program causing a computer to execute a process, the process comprising:
   operating the target object while changing a plurality of measurement conditions set for the target object in a first sequence;
   acquiring first measurement data regarding the operation state of the target object under each of the plurality of measurement conditions set in the first sequence;
   operating the target object while changing the plurality of measurement conditions in a second sequence different from the first sequence,
   acquiring second measurement data regarding the operation state of the target object under each of the plurality of measurement conditions set in the second sequence;
   estimating, by a processor, third measurement data indicating the operation state in a case where the target object enters a steady state in each of the plurality of measurement conditions, based on the first measurement data and the second measurement data;
   generating the model data regarding the operation state of the target object based on the third measurement data; and
   outputting the model data,
   wherein the first measurement data and the second measurement data relate to the operation state before the target object entering the steady state when operated under each of the plurality of measurement conditions, and
   wherein the third measurement data is estimated using a prediction equation with which the first measurement data acquired in the first sequence and the second measurement data acquired in the second sequence exponentially converge on the steady state identical over time for each of the plurality of measurement conditions.

10. The non-transitory computer-readable storage medium according to claim 9, wherein the second sequence is a reverse sequence of the first sequence.

11. The non-transitory computer-readable storage medium according to claim 10, wherein the process further comprising:
    setting a first measurement condition lastly in the first sequence, and
    wherein the first measurement condition is added by doubling a difference between a second measurement condition set to precede the first measurement condition and a third measurement condition set to precede the second measurement condition, and
    the first measurement condition, the second measurement condition and the third measurement condition are included in the plurality of measurement conditions.

12. The non-transitory computer-readable storage medium according to claim 9, wherein the third measurement data is estimated by solving an optimization problem for minimizing an error between fourth measurement data predicted from the prediction equation, and the first measurement data and the second measurement data.

* * * * *